Aug. 10, 1954 N. E. LINDENBLAD 2,686,219

TELEVISION SYSTEM

Filed April 9, 1951

INVENTOR
Nils E. Lindenblad
BY
[signature]
ATTORNEY

Patented Aug. 10, 1954

2,686,219

UNITED STATES PATENT OFFICE 2,686,219

TELEVISION SYSTEM

Nils E. Lindenblad, Princeton, N. J., assignor to Radio Corporation of America, a corporation of Delaware Application April 9, 1951, Serial No. 220,073

3 Claims. (Cl. 178—5.4)

This invention relates to television systems and more particularly to novel methods of and means for obtaining natural color television images. It is a continuation in part of my United States patent application Serial No. 193,958 filed on November 3, 1950.

Color television systems have been proposed in which electrical signals are produced which represent the separate primary color components of the picture which is to be transmitted. At the transmitter these signals may be obtained by optically separating light from the image, scene or object to be transmitted, either in time or space, into separate color component images.

Time separation may be obtained by using a rotating color-filter disc in front of a single pick-up tube while space separation may be obtained by dividing the light in accordance with its color content and directing the component images on an equal number of pick-up tubes. Each of the component images thus obtained contains only the color values of one of the primary colors existing in the picture such as red, green and blue. The component images are each scanned electronically to obtain color component signals representative thereof. The color component signals may be then transmitted either sequentially or simultaneously. At the receiver, the color component signals activate electronic apparatus which reproduces, either in time or in space, separate color component images in the same primary colors. These time-separated component images combine, and the space-separated component images may be optically combined to produce a picture image representing the original picture in natural color.

In the space-separation system it is necessary that the color component images at both the transmitter and the receiver be accurately positioned if true color reproduction is to be obtained. Thus, at the transmitter, it is necessary that the scanning of each of the separate color component images correspond in space-time relationship. Similarly, at the receiver it is necessary that the color component images, which appear on separate kinescopes, be optically combined in registry. Considering the word in its broad sense, the problem at both transmitter and receiver may be called one of registration. While the time-separation system minimizes some of the registration problems, it has the disadvantage that mechanically moving parts are generally required.

It is, therefore, an object of this invention to obtain the advantages of the time-separation system by apparatus which is wholly electronic, employs but a single pick-up or reproducing tube, and is free from the disadvantages of systems known heretofore.

It is also desirable that the transmitted signals be truly representative of the proportion of each component color present in the image to be transmitted. Similarly, the component color images at the receiver should correspond in average brightness to the relative brightness of each component color present in the original image. The satisfaction of these conditions has been termed "color balance."

It is, therefore, a further object of this invention to provide color balance in the system hereinafter disclosed.

There also exists the problem of transmitting the color component signals at the proper time. Thus, in a sequential (time-separation) system, it is necessary that the color component signals be transmitted in proper order, in dot, line or field sequence, and that only signals corresponding to a single color component be generated during any one cycle of the color sequence. Similarly, means are necessary at the receiver to insure that the apparatus which produces the separate color component images be activated in synchronism with the production of these signals at the receiver. Heretofore, this has been accomplished at both transmitter and receiver by placing in the light path a rotating color disc for sequentially causing light from but one of the selected component colors to pass through the optical system at any instant. Devices for achieving this result may be termed light modulators.

Color television transmission and reception has thus been approached from two views; electronically and mechanically. Full electronic systems employing three pick-up tubes or three kinescopes introduce inherent registration problems since it is difficult to provide pick-up tubes or receiving kinescopes which have exactly the same characteristics. As a result, a system maintained in correct registration with one tube will not be in registration if another tube is substituted. Furthermore, the additional components frequently required for registration purposes add to the complexity and cost of the equipment. On the other hand, mechanical systems employing a rotating color disc have been looked upon with disfavor since the picture size is limited and expensive synchronizing circuits are required, particularly in view of the mass and inertia involved.

It is, therefore, a further object of this invention to combine the advantages of the two known systems that is, to provide wholly electronic apparatus which performs the function of the color disc, which avoids registration problems, which employs but a single receiving or pick-up tube and which simultaneously provides control of color balance.

It is a still further object of this invention to provide novel methods of and means for optically separating light from an image into selected color component images, modulating the separate light images so as to produce color component images occurring in time sequence, and recombining the images for viewing or transmission by a single picture tube to thereby avoid registration problems.

It is a further object of the invention to provide novel methods of and means for maintaining registration in color television apparatus.

Still another object of the invention is to provide a novel electronic light modulator.

Still another object of the invention is to provide a novel means for obtaining color balance.

Briefly, according to a preferred form of the invention, at the transmitter, light from an object, scene, view or image to be televised is separated into a plurality of paths, the light image in each path comprising one of the component colors of the object. The light images are directed upon respective light modulators, each comprising a photo-emissive input surface and a phosphorescent output screen. Sequential keying pulses are applied to the light modulators, line or field rate. The resultant time-spaced images are then optically recombined into a single light path, and applied to the photo-cathode of a single pick-up tube for transmission in the normal manner.

At the receiver, the successive color-representing monochrome images produced by a conventional kinescope are optically separated into a plurality of paths and, as in the transmitter, applied to the input surfaces of similar light modulators. The resulting images are reconstituted in their original colors, keyed in synchronism with the transmitted color sequence, and optically recombined to produce complete full color images.

In one embodiment of the invention color selection or reconstitution is obtained by placing component color filters in each light path. In another embodiment of the invention the phosphorescent screen of each light modulator emits light of a different component color.

The above and other objects and advantages of the invention will become apparent upon a consideration of the following detailed description taken in conjunction with the accompanying drawings in which.

Figures 1, 2, 3:
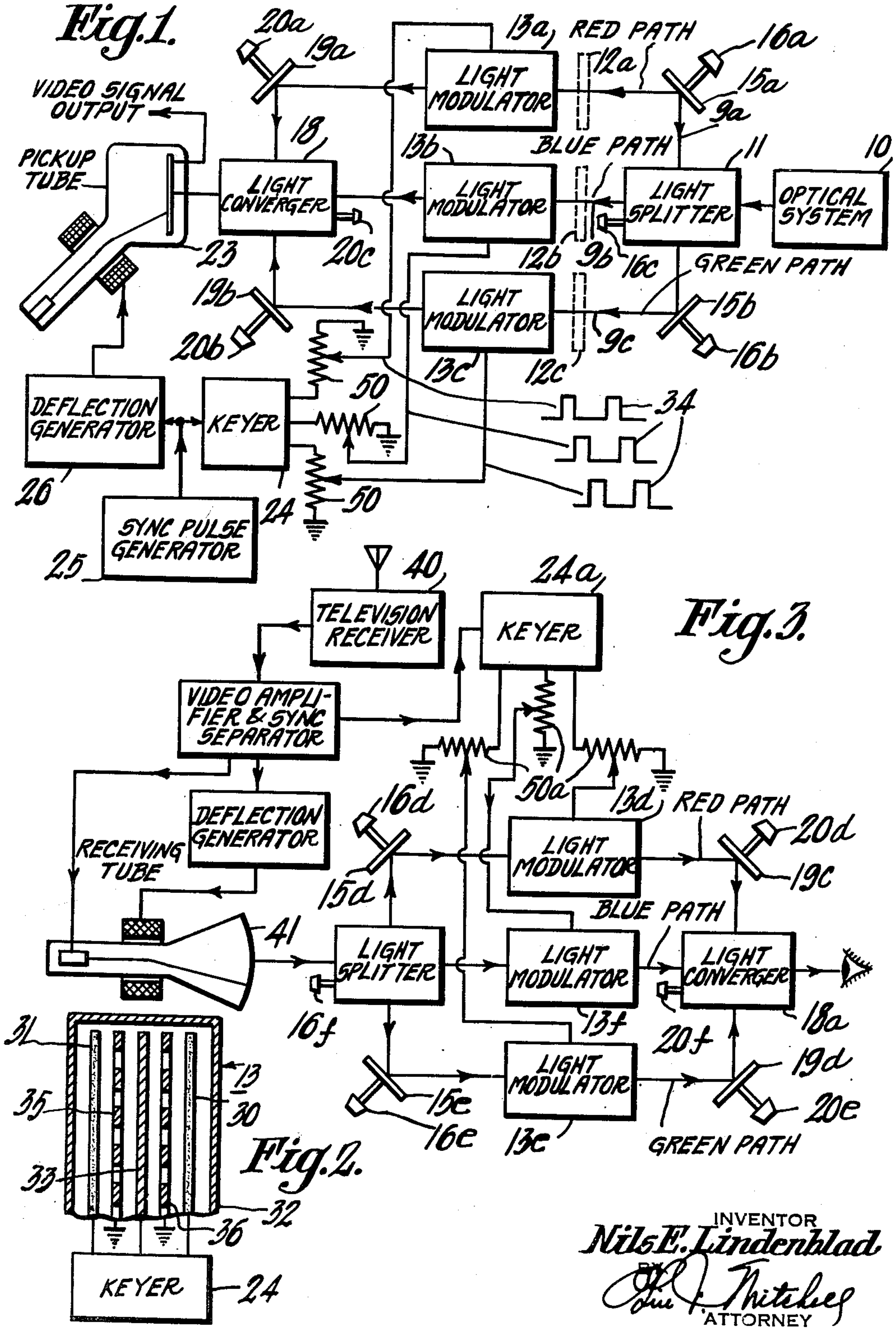
Fig. 1 represents diagrammatically in block diagram an embodiment of the invention as applied to a television transmitter.
Fig. 2 is a fragmentary view of a greatly enlarged cross-section of a light modulator constructed in accordance with the invention.
Fig. 3 represents diagrammatically in block diagram an embodiment of the invention as applied to a television receiver.

Referring to Fig. 1, light from the object, scene, image or view to be televised is collected by a suitable optical system 10. The optical system 10 may be lens system which focuses the light rays reflected from a real object or the lens system of projecting apparatus which focuses light transmitted through a transparency such as a slide or motion picture film. Light from the optical system 10 is focused upon a light splitter 11 which acts to divide the light into three separate paths. The light splitter 11 may take the form of mirrors, prisms, or the like. Such arrangements are well known in the art and are not believed to require further explanation. It is also possible, in accordance with the invention to use color selective means such as dichroic mirrors in the light splitter 11 so that the light in each of the separated paths will represent different selected color components of the original image. Thus, by way of example, light in the upper path 9*a* shown in the drawing may comprise only the red color component in the scene being televised; light in the horizontal path 9*b* from the light splitter may comprise only the blue color component; and, light in the lower path 9*c* comprise only the green color component.

Alternatively, or in addition, the light in the separate paths from the light splitter 11 may be limited to a single component color by placing corresponding filters as indicated by the dotted boxes 12*a*, 12*b* and 12*c* in the separate light paths between the light splitter 11 and the light modulators 13*a*, 13*b* and 13*c* respectively. The filters 12 need not be placed in the position indicated in the drawing but may be placed anywhere in the separate light paths between the light splitter 11 and the light modulators 13.

Suitable light directing means, indicated schematically by the mirrors 15*a* and 15*b* are provided to direct the color component images appearing in the upper and lower light paths to the light modulators 13 from the light splitter 11. The light directing means 15*a* and 15*b* which may be mirrors, for example, and the light splitter 11 are provided with mechanical adjusting means indicated generally by the knobs 16*a*, 16*b* and 16*c*, for adjusting their relative positions and alignment whereby the color component images in each light path may be accurately positioned in focus upon the light modulators 13.

As a further alternative way in which the selected color component images in each path may be provided, the mirrors 15*a* and 15*b* may be given selective color component reflection properties and a single filter used in the light path where no corresponding mirror is employed.

Various combinations of the above-described arrangements will suggest themselves to those skilled in the art and are to be considered as falling within the scope of the invention.

From the above description it will be seen that there has been provided means for separating light from an object, scene image or view to be televised into a number of separate paths corresponding to the number of component colors used in the system, means for producing in each light path a color image corresponding to a single different component color of the the image, scene, view, or object being televised, and means whereby each component image may be accurately focused and positioned upon separate light modulators.

The light modulators 13*a*, 13*b* and 13*c*, the construction and operation of which will be described in detail below, are each provided with a light image producing surface such as a phosphorescent or fluorescent screen. This surface is located on the side of the light modulator opposite that on which the color component images are focused. Light from the image producing surfaces of the light modulators 13*a*, 13*b* and 13*c* is directed upon a light converger 18 by light directing means such as mirrors 19*a* and 19*b*.

The light mirrors 19 are similar to mirrors 15 and serve to direct the light from the upper and lower light modulators 13a and 13c onto the light converger 18. Suitable mechanical means indicated generally by knobs 20a, 20b and 20c are provided whereby the produced light images from the light modulators may be directed to the light converger 18 so that they leave therefrom in exact optical registration. Light from the light converger 18 falls upon a television pickup tube 23 which may be, by way of example, of the orthicon or image-orthicon type.

Control voltages for actuating the light modulators are supplied from a keyer 24 and are fed to the light modulators 13. These control voltages are effective to turn the light modulators off and on. When properly related control voltages are employed the light modulators may be actuated in sequence and in synchronism with the scanning operation of the pickup tube 23. This synchronous operation may be related to the field or line scanning rate of the system. Synchronism is assured by operating both the pickup tube 23, deflection generator 26 and the keyer 24 under the control of pulses derived from a suitable sync pulse generator 25.

Since the color component images are each scanned by the same tube 23 and since the optical image directing means may be optically adjusted so as to insure that each color component image is presented to the face of the pickup tube in exactly corresponding positions the registration problem is reduced to a minimum.

The construction and operation of the light modulators 13 will best be understood by reference to Fig. 2. A photo-emissive input screen 30 and a phosphorescent output screen 31 are mounted within an evacuated glass envelope 32. A secondary-emissive, light-opaque, electron pervious, electrode 33 is positioned between the phosphorescent screen 31 and the photo-emissive screen 30. Perforated plates 35 and 36 are positioned between each of the screens 30 and 31 and the electrode 33. The photo-emissive screen 30, the secondary-emissive electrode 33 and the phosphorescent screen 31 are energized by pulsed, direct current potentials which may be supplied for example from the keyer 24. The voltages to the light modulators 13a, 13b and 13c are supplied from the keyer in time sequence as indicated generally by the wave forms 34 of Fig. 1. Normally, with the light modulator keyed on, the electrode 33 will be maintained at a sufficiently high potential with respect to the photo-emissive screen 31 that the electrons drawn to it from the screen 31 will strike the electrode 33 with sufficient velocity to cause the emission of a large number of secondary electrons. Similarly, the phosphorescent screen 31 is maintained at a sufficiently high potential with respect to the electrode 33 to draw to it the secondary electrons emitted by the electrode 33.

The perforations in the plates 35 and 36 are made quite small and are placed very close together. These plates, which are normally maintained at a low potential relative to the other electrodes, serve to direct the electrons leaving the photo-emissive screen 30 and the secondary-emissive electrode 33 into parallel paths and thus minimize any diffusion effects which might exist due to the random angles at which the electrons leave the screen 30 and the electrode 33. If desired the electric modulator may be subjected to an electro-magnetic field extending in a direction normal to the screens 30, 31 and electrode 33 to improve the desired directivity of the electrons.

In operation, light corresponding to an image falling upon the photo-emissive screen 30 causes electrons to be emitted over the surface of the screen in proportion to the amount of light striking the screen. There is thus formed an electron current image corresponding to the optical light image. Due to the close spacing of the elements and the directive effects of the apertured plate 35, the electron current image strikes the secondary-emissive electrode 33 without distortion. As a result, there is formed by secondary electron emission what might be termed an amplified electron current image which corresponds in detail to the light image. The amplified electron current image, again due to the close spacing of the elements and the directive effects of the apertured plate 36, strike the phosphorescent screen 31. As a result, there is formed at the screen 31 a phosphorescent or fluorescent light image corresponding in detail to the light image falling upon the photo-emissive screen 30. By controlling the intensity of the pulses of potential applied to the light modulator, from the keyer 24, the transmission of light information therethrough may be completely cut-off or varied throughout a wide range.

Various modifications may be made in the light modulators 13 without departing from the scope of the invention. Thus, for some purposes, satisfactory results may be obtained without the perforated plates 35 and 36; particularly if an electromagnetic field is used as indicated above. Similarly, the secondary emissive electrode 33 may be omitted and a single perforated plate or none at all included. Where highly accurate reproductions and high resolution capabilities are desired, a moderate focusing field may preferably be employed as suggested above and as used in well known image amplifiers and in the image section of an image-orthicon. It is also possible to form the phosphorescent screen 31 of material which will emit light of any desired color.

The application of the invention to a receiver will be clear from a consideration of Fig. 3. Sequentially transmitted sets of color component signals, together with the normal synchronizing signals, color synchronizing signals and the like, are received by standard television receiver represented by the box 40. The video signals and deflection signals are applied to the kinescope 41 in the normal manner. The light images produced at the face of the kinescope 41 falls upon a light splitter 11a which separates the light images into three paths. The light splitter 11a is similar in construction and operation to that shown in Fig. 1. However, in the embodiment shown in Fig. 3 it is not necessary to separate the light in the separate paths into separate color components. Mirrors 15d and 15e, in conjunction with the light splitter, direct the light images in three paths respectively onto light modulators 13d, 13e and 13f. Mechanical means indicated generally by the knobs 16d, 16e and 16f are provided to adjust the focusing and positioning of the light images in the separate light paths upon the light modulators 13 in a manner similar to that described in the arrangement shown in Fig. 1. The light modulators 13d, 13e and 13f are each provided with a light emitting phosphorescent or fluorescent screen comprised of different materials whereby they each emit light of a different component color. Thus, by way of example, the light emitting screen of light modulator 13d emits only red light; that of light modulator 13e only green light; and, that of light modulator 13f only blue light. Alternatively, each screen may emit the same color light, say white, and separate color filters may be placed in each light path before convergence of the separate paths. Mirrors 19c and 19d are provided for directing the light in the upper and lower paths onto a light converger 18a. As indicated in the arrangement shown in Fig. 1, mechanical adjusting means, represented by the knobs 20a, 20c and 20f, are provided to insure that the color component images produced in the separate light paths are maintained in exact optical registration.

The operation of this embodiment of the invention is believed apparent. Briefly, the received series of sequential component color signals produce corresponding successive or sequential color component images, or portions of a complete image, on the face of the kinescope 41. However, these images will be monochromatic and will not be in color. Light from the face of the tube is separated into three paths each containing a corresponding component image similar to that appearing on the face of the kinescope. These corresponding images, accurately focused and positioned, fall upon the light modulators 13. The light modulators are keyed in sequence and in synchronism with the presentation of the component color images upon the face of the kinescope, and produce by phosphorescent component color images in the selected component color, either by the use of selective color-emitting phosphorescent screens or color filters in the light paths from the modulators. The color component images are caused to fall upon the light converger 18a in such fashion that they are presented to the eye of the observer in exact registration.

In addition to the simplification of registration problems, the use of light modulators in accordance with the inventions makes possible a ready means of obtaining color balance. Since the light modulators of the invention can not only turn on and off the transmission of light information through them but can vary the amount of light information passed continuously between these limits, it is a relatively simple matter to adjust the amplitude of the potentials applied to each modulator so that the sets of color component signals generated at the transmitter, or the color component light images at the receiver, are of such a value as to insure color balance. One simple manner of obtaining this result is by the provision of individual potential control devices represented generally by the variable resistors 50 in Figs. 1 and 3.

What is claimed is:

1. An image light modulator comprising in combination, optical means dividing said light into a plurality of independent light paths physically separated, a light modulator positioned in each of said light paths through which said light is adapted to pass, means also positioned in each of said light paths limiting the light passing therethrough and along said light path to a different selected component color in each light path, means actuating said light modulators in a predetermined sequence and optical means converging said independent light paths.

2. The invention as set forth in claim 1 and wherein said image light is representative of television images.

3. The invention as set forth in claim 2 and wherein said means actuating said light modulators in a predetermined sequence is controlled by a synchronizing signal.

References Cited in the file of this patent

UNITED STATES PATENTS

| Number | Name | Date |
|---|---|---|
| 2,163,540 | Clothier | June 20, 1939 |
| 2,378,746 | Beers | June 19, 1945 |
| 2,389,039 | Goldsmith | Nov. 13, 1945 |
| 2,389,646 | Sleeper | Nov. 27, 1945 |
| 2,518,199 | Sziklai | Aug. 8, 1950 |
| 2,545,957 | Kell | Mar. 20, 1951 |
| 2,560,168 | Goldsmith | July 10, 1951 |
| 2,594,740 | De Forest | Apr. 29, 1952 |